United States Patent [19]

Stirling et al.

[11] 4,320,775
[45] Mar. 23, 1982

[54] LIQUID METERING UNIT RESPONSIVE TO THE WEIGHT OF THE METERED LIQUID

[75] Inventors: William Stirling, Wirral, England; Robert L. Peres, Neuilly, France

[73] Assignees: The Associated Octel Company Limited, London, England; Octel S.A., Paris, France

[21] Appl. No.: 118,235

[22] Filed: Feb. 4, 1980

[30] Foreign Application Priority Data

Feb. 5, 1979 [FR] France ................................ 79 02882

[51] Int. Cl.³ .......................................... G05D 11/02
[52] U.S. Cl. ......................................... 137/3; 137/98; 137/101.19; 137/101.25; 137/256; 73/309; 222/28
[58] Field of Search ...................... 137/101.19, 101.25, 137/101.27, 256; 73/309; 222/28; 137/2, 3, 98

[56] References Cited

U.S. PATENT DOCUMENTS

| | | | |
|---|---|---|---|
| 2,460,503 | 2/1949 | Howe .................................... | 73/309 |
| 3,353,711 | 11/1967 | Biezunski et al. ..................... | 222/28 |
| 3,690,392 | 9/1972 | Smith .................................... | 177/59 |
| 4,244,211 | 1/1981 | Carpino ................................. | 73/309 |
| 4,244,218 | 1/1981 | Wohrl ................................... | 73/309 |

FOREIGN PATENT DOCUMENTS

480193 9/1927 Fed. Rep. of Germany ...... 137/256
1094818 12/1967 United Kingdom .

*Primary Examiner*—William R. Cline

*Attorney, Agent, or Firm*—Birch, Stewart, Kolasch & Birch

[57] ABSTRACT

A process and apparatus are disclosed for the accurate measurement and control of liquid flow at low flow rates. The invention is particularly applicable to the measurement and control of continuous liquid blending operations, e.g. gasoline blending, in which a liquid additive, e.g. tetraethyl lead, is fed into a continuously flowing liquid stream, the additive being added in precisely controlled amounts requiring precise control of liquid flow at very low flow rates. According to the invention the additive is fed from a stock tank 1 alternately into one or the other of two reservoirs 6, 7 connected in parallel between the inlet line 3 from the stock tank and an outlet line 20. As the one reservoir is being charged, the other is being discharged through the four-way valve 5 to the outlet. Flow through the outlet line 20 is controlled by a valve 22. In accordance with the invention, the mass of liquid is continuously monitored by means in each reservoir sensitive to the weight of liquid in the reservoir which emits a signal proportional to the mass of liquid in the reservoir. This signal is passed to a differentiator for conversion into a flow signal proportional to the mass flow rate. The flow rate signal is fed to a ratio controller 36 for comparison with a demand signal fed via line 39 representing the desired flow rate. Depending on the difference, if any, between the flow signal and the demand signal, a control signal is sent via line 35 to automatically adjust the setting of the valve 22 and bring the flow rate to the desired value.

14 Claims, 1 Drawing Figure

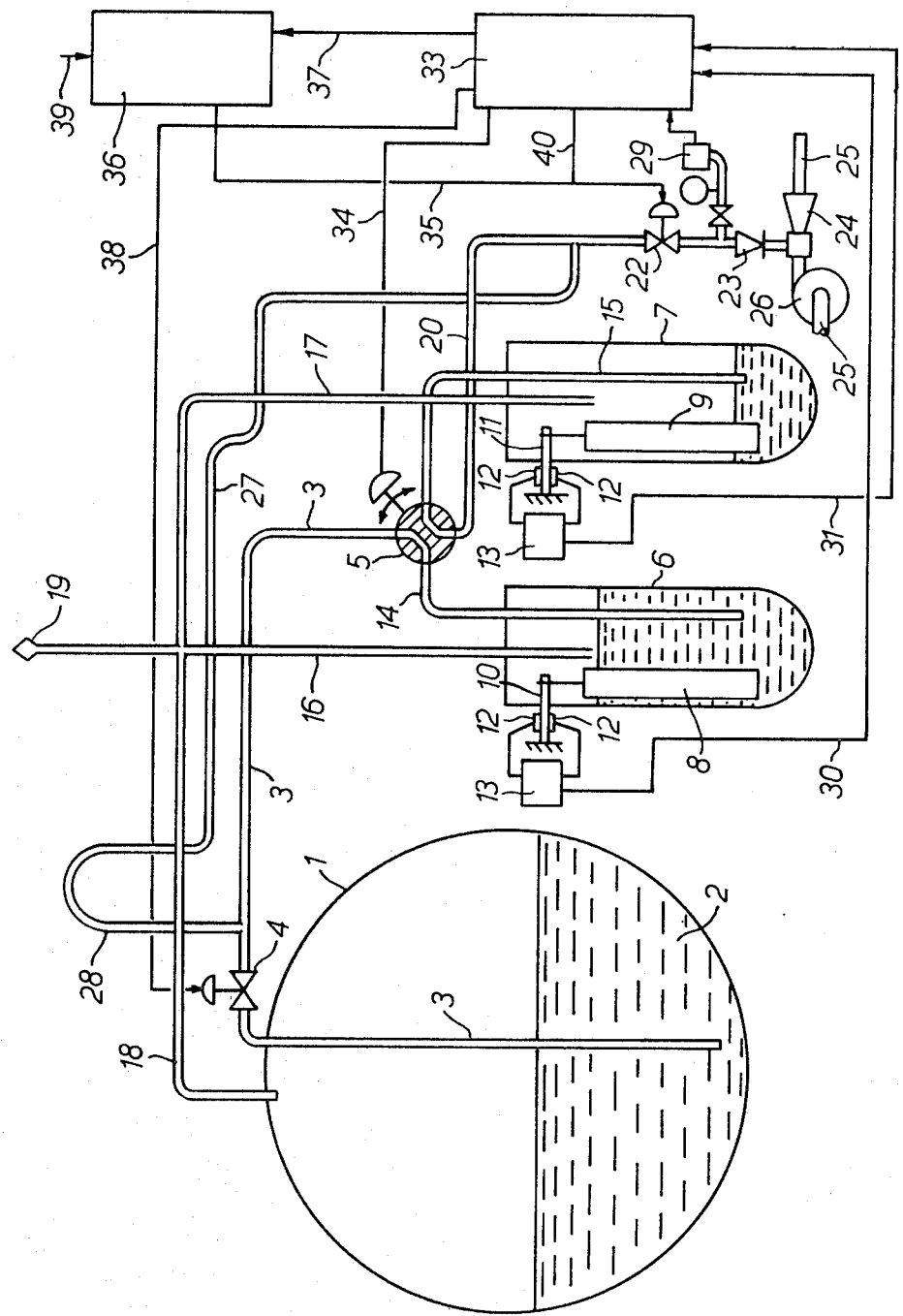

LIQUID METERING UNIT RESPONSIVE TO THE WEIGHT OF THE METERED LIQUID

FIELD OF INVENTION

This invention relates to a process and apparatus for measurement and control of liquid flow at low flow rates. The invention is particularly applicable to the measurement and control of liquid blending operations, especially continuous blending operations, e.g. gasoline blending operations, in which a liquid additive, e.g. an antiknock compound such as a lead alkyl, is continuously added in precisely controlled small amounts to a continuously flowing second liquid e.g. gasoline.

BACKGROUND OF THE INVENTION

In the measurement and control of liquids flowing at low flow rates a number of problems arise, particularly where the liquid is toxic and/or corrosive. In particular, conventional metering equipment does not permit high accuracy in the measurement and control of liquids flowing at low flow rates, e.g. of the order of 0.1 liter per minute, such as are now in demand in gasoline blending operations, where the demand, on environmental grounds, is for ever lower lead levels in gasoline.

Various processes and apparatus have been disclosed in the art for continuously metering liquids and involving two reservoirs which are charged in turn with the liquid, the one reservoir being filled whilst the other is discharged. For example, in U.K. Pat. No. 1,094,818 an apparatus is disclosed comprising two reservoirs connected in parallel between a supply and a discharge conduit. Reversing valves are provided in the feed and discharge conduits to switch the in-flow and out-flow to and from each reservoir in turn. The flow rate is measured by a conventional flow meter connected between the two reservoirs. Such a system is not sufficiently accurate in the metering and control of liquid flow at the low flow rates required by present day technology, due partly to limitations of accuracy inherent in rotational flow meters, but also due to the fact that measurement is by volume, which is subject to variation with temperature, thereby introducing variations in the accuracy of measurement under conditions of varying temperature, as may occur for example, in continuous gasoline blending operations carried out over a period of time. Also reliance on rotary flow-meters involving moving parts is unsatisfactory due to wear and risk of breakdown. Reliability and elimination of breakdowns is particularly important when handling a toxic or hazardous liquid since exposure of maintenance personnel to the liquid, as for example, during essential repair and maintenance work must be kept to a minimum.

In British Pat. No. 811,462 a metering and flow control system is disclosed primarily for particulate solids, but also allegedly for liquids. In that system the material to be metered is fed at a controllable rate into one of two hoppers mounted in parallel, whilst material fed to the other hopper in a previous feed cycle is discharged at a controllable rate into a common collecting trough. Each of the two hoppers is mounted on or suspended from a weighing device, e.g. a transducer or beam balance, which responds to the weight of material in each hopper, i.e. the one being filled and the one being emptied. Control of supply and discharge of the material to and from each hopper is effected by deliberately imparting a progressive unbalance to the two weighing devices coupled with a pneumatic or electrical control system which seeks to bring the system back into balance by opening or closing valves in the supply and discharge lines to the hopper. Such a system is extremely complex and inherently unsuitable for the measurement and precise control of liquids at low flow rates, because the whole weight of the hopper plus its contents is applied to the balance arm or transducer. Compared with this total weight, the weight variation due to the discharge of a liquid at, for example 0.1 liters per minute, is but a minute fraction of the whole, and it is questionable whether such a system would operate with any degree of accuracy at the extremely low flow rates envisaged by the present invention. Moreover, the requirement that each hopper is movably mounted on or suspended from a weighing device presents considerable structural and functional disadvantages.

Other references disclosing continuous feeding apparatus of the type comprising two reservoirs or hoppers mounted in parallel and into one of which, during the first part of the operating cycle, the material to be metered is fed, whilst the material fed to the other during a previous cycle is being discharged, with reversal of the operations of filling and discharging at the end of each cycle, are disclosed in French Pat. No. 1,203,876 and U.S. Pat. No. 3,690,392.

In French Pat. No. 1,203,876 an apparatus is described for the accurate measurement of a liquid at low flow rates comprising two open cups each mounted on the end of a different balance arm. Each cup can be alternately filled and emptied with the liquid to be metered through a set of electrically operated valves. At the opposite end to the cup, each balance arm has a counter-weight attached to the arm by an electromagnet. As each cup is filled with liquid, the weight of liquid in the full cup overcomes the magnetic force holding the weight at the opposite end of the balance arm, and the balance tips moving the cup from a raised filling position to a lowered emptying position. The tipping of the balance arm actuates the control system to shut the respective filling valve and initiate the emptying cycle, which is achieved by pumping the liquid out of the full cup. Once the cup is empty, the electromagnet on the opposite end of the balance arm is re-energised to attract the counter-weight and cause the balance arm to tip back into the filling position. A chronometer is used to measure the filling and emptying time of each cup, and also a counter is provided for counting the number of filling and emptying operations, i.e. the number of balance movements, for each cup within a given time. From these figures, the total mass flow and the instantaneous flow rate over a given period, e.g. one minute, can be determined.

As will be appreciated such a system involves a series of weighing operations in which a discrete predetermined quantity of liquid is weighed out on each balance in turn and then discharged. A sequence of weighing operations is involved using two balances each with moving parts. The reliability of such a system is therefore open to question, particularly when operated over long periods of time, and of course, the system is not open to ready variation or control of the quantity of liquid being discharged. Moreover, the system operates using open cups, which are inherently unsuited to the handling of toxic materials such as lead tetraalkyls.

U.S. Pat. No. 3,690,392 discloses a bulk feeding apparatus in which two hoppers are filled and emptied in alternating cycles with the material to be metered. The weight of each hopper is taken at the end of each filling operation and added to the cumulative total. The system is designed for handling of bulk materials, particularly bulk solids, to produce rapid accurate results under extreme rugged environmental conditions without special care. The system is clearly not operable on liquids at extremely low flow rates under very exact and closely controlled environmental conditions.

OBJECTS OF INVENTION

It is a principal object of the invention to provide a process and apparatus for the measurement and control of liquid flow at low flow rates, which is of high accuracy over a wide range of flow rates including low as well as high values, involves no moving parts, is of high reliability, operates in an enclosed system capable of handling toxic liquids in safety over long periods of time without maintenance, and is readily responsive to changes in demand.

A further object is to provide a process and apparatus for feeding lead alkyls into gasoline during continuous blending operations which is of high accuracy and reliability at low lead levels, i.e. of the order of 0.10 to 0.20 gms of lead per liter of gasoline.

SUMMARY OF INVENTION

In one aspect the present invention provides a process for the control of liquid flow at a desired low flow rate, which comprises alternately filling and emptying two fixed reservoirs, the one reservoir being filled from a supply of the said liquid whilst the other is being emptied through a flow control valve to an outlet pipe, the flow of liquid to and from said reservoirs being automatically switched from one reservoir to the other as the liquid level in the reservoir being emptied sinks to a predetermined level, which comprises:

(a) directly sensing the change of mass of the liquid in the reservoir being emptied by sensing means inside the reservoir;

(b) generating an electrical signal having a value proportional to the rate of mass discharge from the reservoir being emptied;

(c) using that signal for comparison with a demand signal representative of a desired mass flow rate; and (d) allowing adjustment of the setting of the flow control valve in response to any difference between said first signal and said demand signal, thereby to increase or decrease the flow rate from the reservoir being emptied, as may be necessary to achieve equalization of said first signal and said demand signal. Preferably the mass flow rate of the liquid is obtained by sensing the apparent weight of an elongated solid element suspended vertically in the reservoir in question and having a specific gravity greater than the liquid, the liquid level variation in the reservoir being less than the length of the said element, generating a signal proportional to the second apparent weight of the suspended element and using that signal to derive a flow signal proportional to the mass flow rate of the liquid.

In another aspect the invention provides an apparatus for the continuous control of liquid flow at low flow rates, comprising two fixed reservoirs connected in parallel between an inlet line and an outlet line, means for alternately connecting each of said reservoirs in turn to the inlet line whilst the other is connected to the outlet line, so that the one reservoir can be filled with said liquid whilst the other is being emptied, a flow control valve in said outlet line, means inside each reservoir for sensing the mass of the liquid in the reservoir, means for generating a signal proportional to the mass of liquid in each reservoir, means for generating a flow signal proportional to the rate of mass discharge of said liquid from each reservoir during the discharge phase of the operating cycle, and means for automatically adjusting the setting of the flow control valve depending on the deviation of said flow signal from a desired value. Preferably said sensing means comprise an elongated solid element suspended in each reservoir, each element having a specific gravity which is greater than that of the liquid to be measured and a length greater than the liquid level variation in each reservoir, each element being connected to a means which is sensitive to the apparent weight of said element, the said weight sensitive means providing a signal proportional to the mass of the liquid remaining in the respective reservoir as each in turn is emptied. Preferably the weight sensitive means comprise a strain gauge which emits an analogue signal proportional to the apparent weight of each suspended element, and an analogue-digital differential converter is provided for conversion of the analogue signal into a digital flow signal representative of the mass flow rate of the liquid, which flow signal is fed to a ratio controller for comparison with a predetermined digital demand signal.

BRIEF DESCRIPTION OF THE DRAWING

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The FIGURE schematically illustrates an apparatus for the measurement and control of liquid flow at low flow rates in accordance with the present invention.

DETAILED DESCRIPTION OF THE INVENTION

The present invention provides a process and apparatus for the measurement and control of liquid flow at low flow rates, e.g. of the order of 0.1 liters per minute up to 20 liters per minute. The process and apparatus of the invention are particularly applicable to the measurement and control of a liquid additive, e.g. lead alkyls, in liquid blending operations, e.g. continuous gasoline blending operations.

The process and apparatus of the invention involve utilizing two reservoirs mounted in parallel between a supply and an outlet, with means for connecting each reservoir in turn to the supply and to the outlet so that one reservoir can be filled whilst the other is being emptied. At the end of each filling and discharge cycle the connections to the two reservoirs are automatically reversed so that the liquid in the full reservoir can be discharged and the empty reservoir refilled with liquid from the supply ready for the next cycle.

In accordance with the invention, the measurement and flow control is exercised by directly sensing the mass of the liquid in the reservoir being emptied and generating a signal which is proportional to the sensed mass of the liquid. That signal is used to derive a flow signal proportional to the mass flow rate of the liquid. The setting of a flow control valve in the outlet line from the reservoirs is then automatically adjusted depending on the deviation of the flow rate signal from a predetermined value. Although the mass of liquid in each reservoir in turn can be sensed in various ways by pressure sensitive means mounted internally in each reservoir and sensitive to the weight of liquid therein, the mass of the liquid contained in each reservoir is preferably sensed by suspending in each reservoir an elongated solid element having a specific gravity greater than the liquid and a length greater than the variation in liquid level in the reservoir as it is emptied. As the liquid is discharged from each reservoir in turn there is an increase in the apparent weight of the elongated element which is sensed by a means sensitive to the weight of the elongated element and from which the element is suspended. Preferably the weight sensitive means is a strain gauge, e.g. of known type, which emits an electrical signal proportional to the apparent weight of the elongated element, the rate of change of that signal thus being proportional to the rate of mass discharge from the reservoir being emptied. In accordance with this invention, this signal is used to initiate a flow control system hereinafter described, and optionally to provide an indication of the instantaneous mass flow rate at any given moment.

Typically the electrical signal generated by the strain gauge will be an analogue signal the instantaneous value of which is indicative of the mass of liquid remaining in the reservoir at any given moment, and the rate of change of which will be indicative of the mass flow rate from the reservoir. If desired, the analogue signal can readily be converted in a known manner by an analogue-digital differential converter to a digital signal directly indicative of the mass flow rate of the liquid being discharged.

From the discussion so far, it will be apparent that the invention utilizes static measuring means to measure the mass flow rate of the liquid at any given time and the system may be and preferably is operated using totally enclosed vessels as the two reservoirs. The process and apparatus is thus particularly suited to the handling of toxic liquids, such as lead alkyls, in view of the totally enclosed environment and the elimination of measuring means utilizing moving parts, with a consequent reduction in the risk of break down and reduced need of routine servicing. Moreover, measurement is of a mass flow rate, independent of volume and therefore unaffected by temperature changes which will effect the volume, but not the mass, of the liquid remaining in each reservoir.

The control function of the present invention is exercised by comparing the mass flow rate signal generated as each reservoir is emptied with a second or demand signal indicative of a desired flow rate, and automatically adjusting the setting of a flow control valve in the common outlet line from the two reservoirs so that the first signal indicative of the actual flow rate equals the demand signal. In the preferred embodiment of the invention an analogue signal coming from each strain gauge is converted to a digital signal, which is compared with a digital demand signal indicative of the desired flow rate, and depending on the difference, if any, between the flow signal and the demand signal the setting of the flow valve is adjusted to increase, or decrease, the flow rate of the liquid from the reservoir being discharged as may be necessary to equalize the flow signal with the demand signal.

Depending on the type of operation involved, the demand signal may be set at a constant, predetermined level. In continuous liquid blending operations, however, for example, gasoline blending, the demand signal can be variable signal depending on the flow rate of the liquid, e.g. gasoline, into which the additive is to be blended. The system of the present invention therefore provides for total automatic control of the blending operation.

In a further aspect of the control system, the output signal from the respective strain gauge during the discharge cycle can be continuously monitored and when a given value is obtained, indicative of an empty or almost empty reservoir, the reversal of the directional inlet and outlet valves can be automatically effected to switch the inlet and outlet connections from one reservoir to the other and institute the next cycle of filling and discharge.

As will be appreciated, during the change over from one reservoir to the other, which may take as long as 1 or 2 seconds, there will be a momentary cessation of flow signals from the strain gauge in the reservoir that has just finished discharging, before the commencement of signals from the strain gauge in the other, full reservoir which is now connected to the outlet. In the normal course of events the interruption of the flow signal will cause the flow control valve to open to its fullest extent since there is temporarily no flow signal to match the demand signal. Only when the flow from the other reservoir is re-established will there be a resumption of the flow signal, with consequent re-adjustment of the setting of the flow control valve. In operation this temporary opening of the flow control valve to its fullest extent during the change over period has been found to give rise to an initial surge of additive immediately upon reconnection of the second reservoir to the outlet line with some consequential lack of uniformity and accuracy in the blend at this point. To eliminate this surge, it is proposed, in accordance with a preferred feature of this invention, to incorporate into the control system a memory and a substitute signal transmitter which operate in the following way to hold the flow control valve at a constant setting during the change over period. This is achieved, in accordance with the preferred technique of this invention, by activating the memory circuit immediately prior to the initiation of the change over to memorize the flow signal existing at that instant. The substitute signal transmitter is then activated to emit a substitute signal equal to the memorized value and, for the period of the change over, this substitute signal is used in place of the flow signal for comparison purposes with the demand signal. In this way, throughout the change over and until the flow signals are re-established, the flow control valve is maintained at a constant setting, being the setting which existed immediately before the initiation of the change over.

Additionally, to compensate for the head of liquid in the full reservoir the setting of the flow control valve is automatically adjusted to a lower flow value for a brief period at the beginning of each dishcarge phase. As the head of liquid decreases, the flow control valve is gradually opened, thereby eliminating any fluctuation in the flow rate due to the varying head of liquid.

In a further feature of the control system used in accordance with this invention, the output signal from the strain gauge associated with the reservoir being filled, which for the purposes of flow control of the discharge phase can be ignored, can be continuously monitored and used to terminate the filling phase when that output signal reaches a second predetermined value indicative of a full reservoir. In other words, the whole of the operation of filling, discharge and change over can be controlled, and the various phases initiated by monitoring the output signals of the two strain gauges.

As previously indicated, the process and apparatus of the invention are specifically designed for the measurement and control of liquid flow at low flow rates. In practice, the system as described above has been found to provide an accuracy of ±0.15% even at flow rates as low as 0.1 liters per minute. A further feature of the invention, however, is its extreme flexibility since it is found that such accuracies are maintained even up to flow rates of 20 liters per minute without modification. Using conventional rotational flow meters, not only are such accuracies unobtainable at such low flow rates, but conventional rotational flow meters cannot operate over such an extreme range of flow rates. Moreover, the present system is totally enclosed and involves no moving or rotary parts, except the valves, which are all of conventional construction. The system is therefore specifically suited to the handling of toxic and corrosive liquids over long periods of time with minimum maintenance and minimum risk of mechanical failure.

A preferred process and apparatus for the measurement and control of liquid flow at low flow rates in accordance with the present invention are illustrated in the accompanying drawing.

In the description which follows reference will be made specifically to a continuous gasoline blending operation, which is the particularly preferred application of the present invention, but it will be understood that the invention may be applied to other operations involving the measurement and/or control of liquid flow at low flow rates.

Referring to the drawings, a gasoline additive 2 e.g. a lead alkyl such as tetraethyl lead, is contained in a stock tank 1. From the stock tank 1, the lead alkyl can be supplied under gravity via a line 3 into either of two enclosed reservoirs 6 and 7 through a rotary directional four-way valve 5. Line 3 incorporates a stop valve 4 to isolate the stock tank when so desired.

From the four-way valve 5, lead alkyl is fed into one or the other of the two reservoirs 6, 7, depending on the setting of the valve 5 through one or the other of the dip tubes 14 and 15. Simultaneously the four-way valve 5 also serves to connect the other of the two dip tubes 14, 15 to an outlet line 20. In the position actually shown, four-way valve 5 connects inlet line 3 to the dip tube 14 of the left-hand reservoir 6, whilst the dip tube 15 of the right-hand reservoir 7 is connected via the valve 5 to the outlet line 20. As will be appreciated rotation of the valve 5 clockwise, or anti-clockwise, will reverse the connections so that dip tube 15 will be connected to the inlet 3 and dip tube 14 to the outlet line 20.

To permit filling and emptying of the stock tank 1 and the two reservoirs 6 and 7, each is provided with an air vent line 18, 16 and 17, respectively, connected to a common vent 19 to the atmosphere. In reservoirs 6 and 7, air vent lines 16 and 17 extend a short distance downwardly into each reservoir and terminate just above the normal liquid level in the reservoir when full, see reservoir 6. This arrangement provides a safety function, as hereinafter described.

Connected in outlet line 20 is a flow control valve 22 and a non-return valve 23 which prevents back surges from gasoline flowing in a gasoline flow line 25. Gasoline flow line 25 includes a pump 26 and an eductor 24 which, in operation creates a suction in the outlet line 20, thereby to draw lead alkyl from whichever reservoir 6 or 7 is for the time being connected to the outlet. The rate of flow of lead alkyl from the reservoir being discharged, reservoir 7 in the drawing, is controlled by the flow valve 22 in a manner to be described.

Connected to the outlet line 20 between the flow control valve 22 and the non-return valve 23 is a vacuum line connected to a vacuum gauge 29. In the event of a failure of the eductor 24, the increase of pressure in the outlet line 20 is sensed by the pressure gauge 29 and a signal sent to the control system, to be described, to initiate the closing of the flow control valve 22 as a safety measure until the failure of the eductor is remedied.

A further line 27, including a barometric loop 28, connects the inlet line 3, downstream of the stop valve 4 to the outlet line 20 upstream of the flow control valve 22. The line 27 serves to prime of apparatus during the start-up phase in a manner which is to be described.

In accordance with the particular feature of the present invention, in each reservoir 6 and 7 is suspended an elongated solid element 8, 9 having a specific gravity which is greater than that of the liquid in question, in the specific case under discussion, lead alkyl. Furthermore, as will be seen from the drawing, in which reservoirs 6 and 7 are illustrated in their substantially full and empty states, respectively, the length of each element is greater than the level of liquid variation in each reservoir. Thus, at all times, the respective solid element will be partially immersed in the lead alkyl. The two elongated solid elements 8, 9 are suspended within each reservoir from rigid rods 10, 11 mounted on the walls of the respective reservoir. Applied to each rod are strain gauges 12 comprising a known type of sensor 13 which is responsive to the apparent weight of the element suspended within each reservoir. These strain gauges may be of a known type, e.g. those commercially available from Transmelec, of Ivry in France. These strain gauges transmit a current the value of which is proportional to the apparent weight of the suspended element, and thus proportional to the mass of liquid contained in the reservoir. In practice, the strain gauges provide an operating current varying over the range 4 to 20 milliamps.

Preferably the two reservoirs have a constant cylindrical cross-section with the suspended solid elements likewise having a constant cylindrical cross-section. With such an arrangement there is a direct proportionality between the mass of liquid in the reservoir and the apparent weight of the element and hence the rate of variation of the signal emitted by the strain gauge during discharge is directly proportional to the mass flow rate from the reservoir. Other sections are however, theoretically possible to obtain the same result, but are obviously not preferred purely for constructional reasons.

The signal from the strain gauge sensors 13 is fed via leads 30 and 31 to control unit 33. The control unit 33 comprises an analogue-digital differential converter which converts the analogue signals received from the sensors into a digital signal comprising a series of pulses, the frequency of which is proportional to the rate of change of the analogue signal, which in turn is proportional to the rate mass discharge which is reflected by the change in apparent weight of the suspended element.

Connected to the control unit 33 via line 37 is a ratio controller 36 which compares the digital signal produced in the control unit 33 and passed to the controller 36 by the connecting line 37 with a digital demand signal fed to the controller via line 39. The digital demand signal is produced in a known manner and is proportional to the flow rate of the gasoline.

Control lines 34 and 38 connect the control unit 33 to the four-way directional valve 5 and the stop valve 4 respectively, whilst a control line 35 connects the controller 36 to the flow control valve 22.

The circuitry involved in both the control unit 33 and the ratio controller 36 is conventional in the art and is similar to that already used in the electronic control of gasoline blending operations. The required circuitry, including the refinements discussed subsequently, will be well within the capability of the person skilled in the art and, as such, forms no part of the present invention.

The operation of the apparatus illustrated by the accompanying drawing is as follows. After the system is primed by evacuating the barometric leg 28, the lead alkyl will flow under gravity into whichever of the two reservoirs 6 or 7 is connected to the line 3 by the four-way valve 5. In the figure, this is the left-hand reservoir 6, although it will be appreciated that, as shown, this is at the end of the filling cycle, rather than at the beginning. Continuing with the filling phase of the operating cycle, the rising level of liquid in the reservoir being filled will cause a gradual decrease in the apparent weight of the respective solid element which will be sensed by the respective strain gauges. The output current from the respective sensors 13 will correspondingly increase from a minimum valve of about 4 ma. to a maximum of about 20 ma. This analogue signal will be passed by line 30 to the control unit 33 where it is continuously monitored. As soon as the current emitted by the strain gauge sensor associated with the reservoir being filled reaches a predetermined value, e.g. 20 ma, indicating a full tank, a signal is sent by the control unit 33 via line 38 to close the stop valve 4 and terminate the filling operation. In the event of failure of the stop valve 4 the liquid level in the reservoir being filled will eventually reach the end of the air vent dip tube 16 or 17 as the case may be, and once the end of this tube is sealed by the rising liquid, liquid flow will stop automatically. The downwardly extending ends of the air vent tubes 16 and 17 therefore provide a safety function in the event of failure of the stop valve 4 to close.

Considering now the discharge phase, the eductor 24 serves to draw liquid from whichever reservoir 6 or 7 is connected to the outlet line 20 by the four-way valve 5, in the case shown, this is the right-hand reservoir 7. During the discharge phase the increasing apparent weight of the suspended element 9, due to the falling level of liquid, will be sensed by the respective strain gauges 12 and sensor 13. The analogue signal emitted by the respective sensor 13, which will progressively fall in value from approximately 20 ma at the commencement of discharge to about 4 ma at the end of the discharge phase, is fed via line 31 to the control unit 33 where it passes to an analogue-digital differential converter, not shown, to be converted into a pulse signal, the frequency of which is proportional to the rate of mass discharge from the reservoir being emptied.

From the control unit 33 the digital signal is sent via line 37 to a ratio controller 36 which is also fed with a digital demand signal via line 39 generated in known manner and proportional to the gasoline flow rate. In controller 36 the digital flow signal is compared with the demand signal, and depending on whether the flow signal is above or below the demand signal, a command signal is sent via line 35 to the flow control valve 22 to adjust the setting thereof, either to increase the flow rate, or to decrease the flow rate, as may be necessary to adjust the flow signal to the demand signal. In this way the mass flow rate of lead alkyl is controlled as a function of the flow rate of the gasoline stream into which the lead alkyl is to be blended.

During the discharge phase also, the output signal from the sensor associated with the reservoir being emptied is continuously monitored by the control unit 33 and as soon as a predetermined minimum value is reached control signals are sent via line 34 to the four-way directional valve 5 to reverse the connections of the reservoirs 6 and 7 to the inlet and outlet lines 3 and 20, and via line 38 to open the stop valve 4. With this reversal of the connections, the empty reservoir is now refilled under gravity from the stock tank in the manner described, and the reservoir filled on the previous cycle is discharged via the outlet line 20.

Incorporated into the control unit 33 is a memory and substitute pulse transmitter which operate during the change over to produce a substitute pulse signal equal in value to the digital signal output from the analogue-digital converter as existing immediately before the initiation of the change over and as memorized by the memory. During change over, which may take one or two seconds, the substitute signal is fed from the control unit 33 via line 37 in the ratio controller 36 in place of the digital signal from the analogue-digital converter, which will disappear momentarily during the change over. The substitute digital signal serves to maintain the flow control valve at a constant setting over the change over period and until a genuine signal is re-established from the sensor associated with the recently filled reservoir which is now connected to the discharge line. The establishment of a substitute pulse signal during the change over eliminates the surge which otherwise occurs at the recommencement of the discharge operation as a result of the momentary interruption of the flow signal which unavoidably occurs at the instant of change over. In the absence of a substitute pulse signal, the brief cessation of a true pulse signal would cause the flow control valve 22 to open to its fullest extent at each change over, resulting in an initial surge of liquid before the setting of the valve is re-adjusted.

To avoid unevenness of flow resulting from the increased head of liquid in the full reservoir which is now connected to the outlet line, at the beginning of each discharge phase a signal is sent by the control unit 33 via line 40 to the flow control valve 22 to reduce temporarily the setting of the valve. As the head falls this signal is gradually phased out, so that the setting of the valve gradually increases as the head of liquid falls. This compensation is a temporary operation lasting only during the initial stage of each discharge phase.

As will be appreciated, the filling and discharge operation can be carried out substantially independently, that is to say, the filling phase of the one reservoir will be completed well in advance of the corresponding discharge phase of the other reservoir. The full reservoir is then held pending the completion of the discharge phase from the other reservoir and the change over.

Variations and modifications in the process and apparatus described above will be apparent to those skilled in the art, without departing from the scope of the invention as claimed. For example, instead of using the signals emitted by the sensors to initiate the change over and/or to terminate the filling operation, these functions may be fulfilled by other types of limit switch, e.g. float switches, positioned in the reservoirs at the appropriate levels and connected in an appropriate control circuit to the four-way directional valve 5 and the stop valve 4. Alternatively, the filling phase can be terminated by allowing the rising liquid simply to seal the end of the air vent pipe.

In addition, of course, either the analogue signal output by the strain gauge of the reservoir being emptied, or the converted digital signal can be used to give a visual or other display of the instantaneous mass flow rate.

Instead of a variable demand signal, a constant demand signal may be used in order to obtain a constant rate of mass discharge.

Instead of using a strain gauge in each reservoir to sense the change in apparent weight of the elongated element, other means, e.g. a pressure transducer mounted in the bottom of each reservoir, may be used to sense the changing mass of liquid in each reservoir during the filling and discharge phases, and to generate a signal proportional thereto, which signal can then be used to monitor and control the rate of mass discharge in the manner already described.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In a process for the control of liquid flow at a desired low flow rate, which comprises alternately filling and emptying two fixed reservoirs, the one reservoir being filled from a supply of the said liquid while the other is being emptied through a flow control valve to an outlet pipe, the flow of liquid to and from said reservoirs being automatically switched from one reservoir to the other as the liquid level in the reservoir being emptied sinks to a predetermined level, the improvement which comprises:
   (a) continuously sensing the change of apparent weight of an elongated solid element suspended in the reservoir being emptied, said element having a specific gravity greater than said liquid and a length that is greater than the variation of liquid level in the said reservoir;
   (b) generating an analogue electrical signal proportional to the sensed apparent weight of said solid element;
   (c) converting the analogue signal to a digital flow signal proportional to the rate of change of said analogue signal and thus proportional to the rate of mass discharge from the reservoir being empltied;
   (d) comparing the digital flow signal with a digital demand signal representative of a desired mass flow rate;
   (e) automatically adjusting the setting of the flow control valve in response to any difference between the digital flow signal and said demand signal, thereby to increase or decrease the mass flow rate from the reservoir being emptied, as may be necessary to achieve equalization of said digital flow signal and said demand signal;
   (f) continuously monitoring said analogue signal;
   (g) automatically switching the discharge from one reservoir to the other when said analogue signal reaches a predetermined level; and
   (h) immediately prior to the switch over from one reservoir to the other, memorizing the frequency of said digital signal as existing immediately prior to the change over of liquid discharge from one reservoir to the other, generating a substitute digital flow signal having a frequency equal to that of the memorized signal, and during the period of change over using that substitute digital flow signal in step (d) for comparison with said demand signal, thereby to maintain the setting of the flow control valve unchanged during the period of the change over.

2. A process according to claim 1, wherein at the beginning of each discharge phase, the setting of the flow control valve is temporarily reduced to compensate for the increased head of liquid in the full reservoir.

3. In a continuous blending process in which an additive liquid is fed at a controlled rate into a continuously flowing stream of a second liquid, which comprises feeding the liquid additive from a supply alternately into two fixed reservoirs mounted in parallel and discharging the liquid additive from said reservoirs at a controlled rate through a flow control valve into said stream of second liquid, the one reservoir being filled while the other is being discharged, the improvement which comprises:
   (a) generating an electrical signal having a value proportional to the rate of mass discharge from the reservoir being emptied;
   (b) using that signal for comparison with a demand signal representative of the desired mass flow rate of the liquid additive;
   (c) allowing adjustment of the setting of the flow control valve in response to any difference between said first signal and said demand signal, thereby to increase or decrease the flow rate of the additive from the reservoir being emptied, as may be necessary to achieve equalization of said first signal and said demand signal;
   (d) automatically switching the discharge from one reservoir to the other when the signal from the reservoir being emptied reaches a predetermined value;
   (e) immediately prior to switching over from one reservoir to the other, memorizing the said value of said electrical signal as it exists immediately before the change over, generating a substitute signal equal to that memorized value, and substituting that substitute signal, during the period of change over, in place of the actual signal for comparison with said demand signal, thereby to maintain the setting of the flow control valve unchanged during the period of change over;
   (f) cyclically repeating operations (a) to (e) with respect to each reservoir in turn as it is being emptied.

4. A process according to claim 3, wherein the demand signal is a variable signal proportional to the rate of flow of said second liquid.

5. A process according to claim 3, wherein the rate of mass discharge from each reservoir in turn is monitored by sensing the change in apparent weight of a solid elongated element suspended in the reservoir, said element having a specific gravity greater than that of said additive and a length that is greater than the variation of liquid level in the reservoir during the emptying and filling operations and extending into the mass of liquid contained therein, said element being suspended from a strain gauge comprising a sensor which emits an analogue electrical signal proportional to the sensed apparent weight of the suspended element, and wherein, in step (a) said analogue signal is converted into a digital flow signal having a frequency proportional to the rate of change of said analogue signal and proportional to the rate of mass discharge from the reservoir being emptied, said digital flow signal being compared in step (b) with a digital demand signal having a frequency proportional to the desired flow rate of the additive, and wherein in step (c) said flow control valve is automatically adjusted in accordance with the difference, if any, between the frequencies of the digital flow signal and the digital demand signal.

6. A process according to claim 5, wherein during the filling operation, the analogue signal generated by the strain gauge associated with the reservoir being filled is monitored and wherein the filling operation is terminated automatically when that analogue signal reaches a predetermined maximum value.

7. A process according to claim 5, wherein at the beginning of each discharge phase, the setting of the flow control valve is temporarily reduced to compensate for the head of liquid in the full reservoir.

8. A process according to claim 5, wherein the frequency of said digital signal as existing immediately prior to the change over of liquid discharge from one reservoir to the other is memorized and a substitute digital flow signal having a frequency equal to that of the memorized signal is generated and used during the period of change over for comparison with said demand signal thereby to maintain the setting of the flow control valve unchanged during the period of the change over.

9. A process according to claim 3, wherein said first liquid is a lead alkyl and said second liquid is gasoline.

10. In an apparatus for the continuous control of liquid flow at low flow rates, comprising two fixed reservoirs connected in parallel between an inlet line and an outlet line, means for alternately connecting each of said reservoirs in turn to the inlet line while the other is connected to the outlet line, so that the one reservoir can be filled with said liquid while the other is being emptied, a flow control valve in said outlet line, means associated with each reservoir for sensing the amount of liquid in the reservoir, means for generating a signal proportional to the amount of liquid in each reservoir, means for generating a flow signal proportional to the rate of discharge of said liquid from each reservoir during the discharge phase of the operating cycle, and means for automatically adjusting the setting of the flow control valve depending on the deviation of said flow signal from a desired value, the improvement comprising:

said sensing means being sensitive to the mass of the liquid contained in the reservoir, said signal generating means generating a signal which is proportional to the mass of liquid in each reservoir and said flow signal generating means generating a signal which is proportional to the rate of mass discharge of said liquid from each reservoir during the discharge phase of the operating cycle, and further including means for memorizing said flow signal as existing immediately prior to the change over from one reservoir to the other, means for generating a substitute signal equal to the memorized signal and means for feeding that substitute signal to said comparing means for the period of the change over, thereby to maintain the flow control valve at a constant setting during the change over.

11. An apparatus according to claim 10, wherein said sensing means comprise a solid elongated element vertically suspended in each reservoir and extending into the mass of liquid when contained in said reservoir, said element having a specific gravity greater than that of said liquid and a length greater than the variation of liquid levels within the reservoir during the filling and emptying operations and means for sensing the change in apparent weight of said elongated element during the discharge of said liquid from the reservoir.

12. An apparatus according to claim 11, wherein said means for sensing the change in apparent weight of said element during the discharge phase comprise a strain gauge from which said element is suspended and which, in use, emits an anlogue signal having a value proportional to the sensed weight of the suspended element, said apparatus further including an analogue digital differential convertor for converting said analogue signal to a digital signal proportional to the mass flow rate of the liquid from the reservoir being discharged, means for comparing that digital flow signal with a digital demand signal representative of the desired mass flow rate and means for automatically adjusting the setting of the flow control valve depending on the difference between said flow signal and said demand signal.

13. An apparatus according to claim 12, wherein said memorizing means include means for memorizing said digital signal as existing immediately prior to the change over from one reservoir to the other, and said substitute signal generating means generate a substitute digital signal equal to the memorized signal for feeding to said comparing means for the period of the change over.

14. In a process for the control of liquid flow at a desired low flow rate, which comprises:

alternately filling and emptying two fixed reservoirs, the one reservoir being filled from a supply of the said liquid while the other is being emptied through a flow control valve to an outlet pipe, the flow of liquid to and from said reservoirs being automatically switched from one reservoir to the other as the liquid level in the reservoir being emptied sinks to a predetermined level, continuously monitoring the rate of discharge of the liquid from the reservoir being emptied;

generating an electrical signal having a value proportional to the rate of discharge from the reservoir being emptied;

utilizing the electrical signal for comparison with a demand signal representative of a desired flow rate;

adjusting of the setting of the flow control valve in response to any difference between said first signal and said demand signal, thereby to increase or decrease the flow rate from the reservoir being emptied, as may be necessary to achieve equalization of said first signal and said demand signal;

continuously monitoring said signal, and when said signal reaches a predetermined value, automatically switching over the discharge from one reservoir to the other;

the improvement which comprises:
memorizing the value of said signal as it exists immediately before said change over, generating a substitute signal equal in value to the memorized value, and substituting that substitute signal in place of the genuine signal for comparison with said demand signal during the period of change over.

* * * * *